Jan. 24, 1933.  R. FISHER  1,895,282

MEANS FOR SHAPING HEDGES

Filed Jan. 28, 1932

Inventor
R. Fisher

Patented Jan. 24, 1933

1,895,282

UNITED STATES PATENT OFFICE

RAYMOND FISHER, OF RIDGEWOOD, NEW JERSEY

MEANS FOR SHAPING HEDGES

Application filed January 28, 1932. Serial No. 589,463.

This invention relates to the shaping of hedges and aims to provide a novel method and means whereby various configurations of animals, objects of art, or other figures, may be produced.

It is also aimed to provide a novel shaper or form adapted initially to be temporarily supported on a hedge and to gradually become secured to the hedge by the branches thereof, which after proper growth are adapted to be trimmed to simulate the figure or object represented by the form or shape.

The more specific objects and advantages will become apparent from a consideration of the description following taken in connection with the accompanying drawing illustrating an operative embodiment.

In said drawing:—

Figure 1:
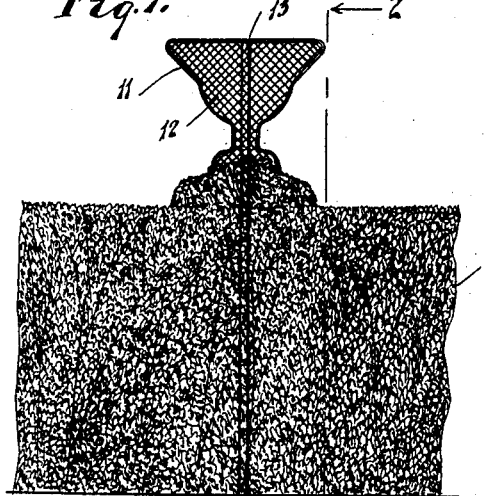
Figure 2:
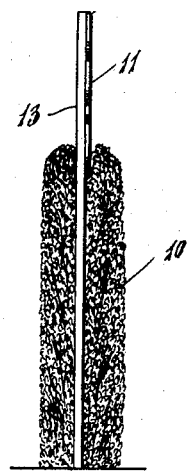
Figure 3:
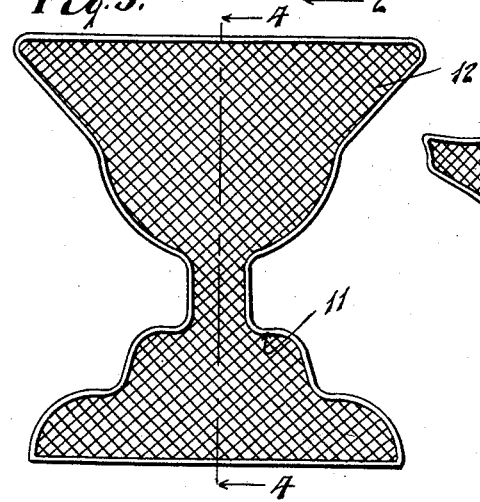
Figure 4:
Figure 5:
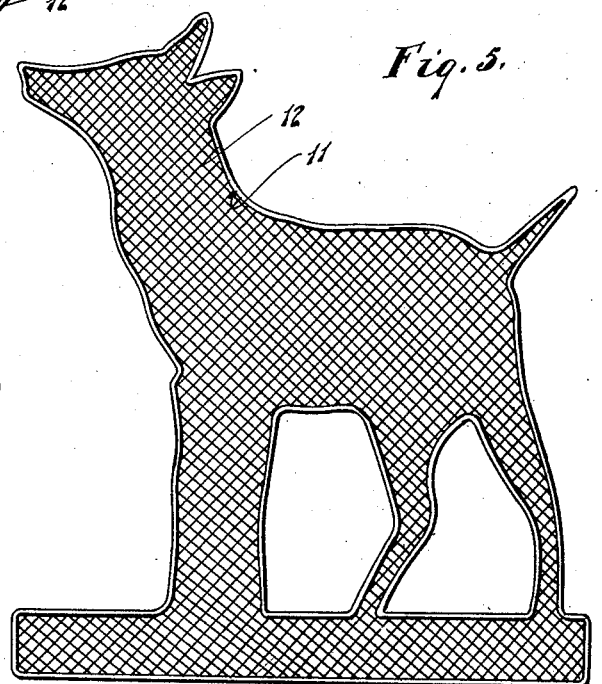

Figure 1 is a fragmentary elevation of a hedge having one of the forms placed thereon, Figure 2 is a cross section taken on the line 2—2 of Figure 1, Figure 3 is an elevation of one of the forms, Figure 4 is a cross sectional view taken on the line 4—4 of Figure 3, and Figure 5 is an elevation of a second form or shape.

Referring specifically to the drawing, 10 represents a conventional hedge, for instance, of privet. This type of hedge grows rapidly and may be trained and trimmed into the form of various figures, and my invention aims towards this end.

In carrying out the invention, a form, for instance, as shown in Figures 3 and 4 is provided. This form consists of a metallic marginal wire 11 of sufficient stiffness to have stability in any shape in which it is provided and the space surrounded by the wire is filled with metallic netting, grating, chicken wire or the like, as at 12, the ends of the wire 11 being soldered or spliced together and the netting 12 being soldered or suitably fastened to the wire 11. The shape or form may be of any desired figure, that in Figure 3 representing a pedestal. By way of example, figures of dogs, cats, other animals, birds, flowers, pots, or any figure may be represented. Figure 5 is another example wherein the form simulates a dog.

In practicing the invention, a stake of wood, for example, as at 13 may be driven centrally of the hedge, and the form of Figures 3 and 5, or any other form secured thereto by wires or otherwise, and resting on the top of the hedge. At the same time, a few of the adjacent branches or twigs of the hedge are passed through the meshes of the screen 12, to aid in securing the form in place. In the course of time, many branches and sprigs will grow through the spaces and thus the form will be supported by the hedge itself. In the course of time, the branches or twigs are trimmed to simulate the form, and thus a very ornamental effect for a hedge will be produced.

It will be realized that the invention may be practiced by an amateur gardener as well as a professional. In addition, the form is preferably painted green, although it may be painted in any desired color or manner.

Various changes may be resorted to provided they fall within the spirit and scope of the invention.

I claim as my invention:—

A figure form for decorating hedges, comprising a form outlined by marginal wire, a filling for said form consisting of metallic netting secured to said marginal wire and providing means for supporting branches growing from a hedge, said form being initially secured in position above the hedge by means of a stake secured thereto and driven through the hedge into the ground, the metallic netting providing means for holding and training the hedge into a configuration involving the form.

In testimony whereof I affix my signature.

RAYMOND FISHER.